US008011628B1

(12) United States Patent
Suddeth

(10) Patent No.: US 8,011,628 B1
(45) Date of Patent: Sep. 6, 2011

(54) REMOTE READING METER BRACKET

(75) Inventor: Terry Lee Suddeth, Bradenton, FL (US)

(73) Assignee: Dennis P. Suddeth, Brandon, FL (US)

( * ) Notice: Subject to any disclaimer, the term of this patent is extended or adjusted under 35 U.S.C. 154(b) by 517 days.

(21) Appl. No.: 12/287,450

(22) Filed: Oct. 9, 2008

Related U.S. Application Data

(60) Provisional application No. 60/998,103, filed on Oct. 9, 2007.

(51) Int. Cl.

| | |
|---|---|
| ***A47B 96/00*** | (2006.01) |
| ***A47K 1/00*** | (2006.01) |
| ***A47K 5/00*** | (2006.01) |
| ***E04G 5/06*** | (2006.01) |
| ***F16L 3/08*** | (2006.01) |
| ***F16L 21/00*** | (2006.01) |
| ***F21V 21/00*** | (2006.01) |
| ***F21V 35/00*** | (2006.01) |

(52) U.S. Cl. .............. 248/225.11; 248/200; 248/223.41; 248/298.1; 248/309.1

(58) Field of Classification Search .................. 248/200, 248/225.11, 223.41, 220.22, 298.1, 309.1; 73/861, 861.351, 195, 196, 272 R, 273
See application file for complete search history.

(56) References Cited

U.S. PATENT DOCUMENTS

| | | | | | |
|---|---|---|---|---|---|
| 3,710,096 | A | * | 1/1973 | McFarlin | 248/27.1 |
| 4,022,415 | A | * | 5/1977 | Roderick et al. | 248/298.1 |
| 4,367,652 | A | * | 1/1983 | Venuso | 73/861 |
| 4,612,740 | A | * | 9/1986 | Yamamoto | 248/225.11 |
| 4,613,135 | A | * | 9/1986 | Rush | 473/488 |
| 4,874,147 | A | * | 10/1989 | Ory et al. | 248/210 |
| 5,298,894 | A | | 3/1994 | Cerney et al. | |
| 5,416,475 | A | | 5/1995 | Tolbert et al. | |
| 5,621,419 | A | | 4/1997 | Meek et al. | |
| 5,760,706 | A | | 6/1998 | Kiss | |
| 5,788,198 | A | * | 8/1998 | Sharpe | 248/210 |
| 5,808,188 | A | * | 9/1998 | Chriswell et al. | 73/114.32 |
| 5,825,303 | A | | 10/1998 | Bloss, Jr. et al. | |
| 5,877,703 | A | | 3/1999 | Bloss, Jr. et al. | |
| 6,072,405 | A | | 6/2000 | Sears | |

(Continued)

*Primary Examiner* — Terrell McKinnon
*Assistant Examiner* — Michael McDuffie
(74) *Attorney, Agent, or Firm* — Frijouf, Rust & Pyle, P.A.

(57) ABSTRACT

An antenna mounting bracket is disclosed for mounting an antenna within a water meter container. The mounting bracket comprises a first plate having a top surface, a bottom surface, a front edge and a rear edge. A first elongated aperture and a first slit traverse through the first plate. A first step is secured to the rear edge of the first plate for supporting the first plate upon the lip of the water meter container. A second plate defines a top surface, a bottom surface, a front edge and a rear edge. A second elongated aperture and a second slit traverse through the second plate. A second step is secured to the rear edge of the second plate for supporting the second plate upon the lip of the water meter container. The bottom surface of the first plate slidably engages adjacent to the top surface of the second plate with the first step being a mirror image of the second step for defining an adjustable bracket length. The first elongated aperture overlays the second elongated aperture for defining an adjustable elongated aperture. The first slit overlays the second slit for defining an adjustable slit. A fastener traverses through the adjustable slit for securing the first plate to the second plate after setting the adjustable bracket length to equal the water meter container. The adjustable elongated aperture engages the antenna for positioning the antenna above the water meter.

10 Claims, 5 Drawing Sheets

U.S. PATENT DOCUMENTS

| | | | |
|---|---|---|---|
| 6,177,883 B1 | 1/2001 | Jennetti et al. | |
| 6,218,995 B1 | 4/2001 | Higgins et al. | |
| 6,300,907 B1 | 10/2001 | Lazar et al. | |
| 6,378,817 B1 | 4/2002 | Bublitz et al. | |
| 6,414,605 B1 | 7/2002 | Walden et al. | |
| 6,617,976 B2 | 9/2003 | Walden et al. | |
| 6,851,567 B2 | 2/2005 | McKinnon | |
| 6,954,144 B1 | 10/2005 | Kiser et al. | |
| 6,968,969 B1 | 11/2005 | McKinnon, Jr. | |
| 7,429,021 B2 * | 9/2008 | Sather et al. | 248/201 |
| 7,698,753 B2 * | 4/2010 | Jones et al. | 4/643 |
| 2004/0196159 A1 | 10/2004 | Brennan et al. | |
| 2006/0103547 A1 | 5/2006 | Salser, Jr. et al. | |
| 2006/0226325 A1 | 10/2006 | Cook et al. | |
| 2007/0007414 A1 * | 1/2007 | Matsuda et al. | 248/298.1 |

* cited by examiner

REMOTE READING METER BRACKET

CROSS-REFERENCE TO RELATED APPLICATIONS

This application claims benefit of U.S. Patent Provisional application Ser. No. 60/998,103 filed Oct. 9, 2007. All subject matter set forth in provisional application Ser. No. 60/998,103 is hereby incorporated by reference into the present application as if fully set forth herein.

BACKGROUND OF THE INVENTION

1. Field of the Invention

This invention relates to brackets and more particularly to a bracket system for mounting an antenna within a water meter container.

2. Background of the Invention

Wireless communication has substantially expanded into many different industries. One such type of industry are the water utilities that are operated by the municipalities. In the past, the volume of water consumed by a resident was measured by a water meter located within a water meter box. The water meters included a numerical display that was controlled by a mechanical indexing device. As such, it was required that an individual must actually view the numerical display in order to determine the volume of water consumed. Since a municipality may include hundreds of thousands of residents, the time and cost to have an individual inspect each water meter to record the numerical display was very substantial.

Presently, municipalities are utilizing a wireless communication system with the water meters for transmitting data related to the volume of water consumed to a municipality receiver. This wireless communication system removes the time and cost of having an individual inspect each water meter. The wireless communication systems include an electronic water meter for measuring the volume of water consumed by a resident. The wireless communication system also includes a transmitter that is electrically coupled to an antenna. The mounting of the antenna is critical for the wireless communication system to operate properly.

The following U.S. Patents and U.S. Patent Applications are examples of attempts of the prior art to achieve one or more of the above characteristics.

U.S. Pat. No. 5,298,894 to Cerny, et al. discloses a remote meter reading arrangement in which utility consumption data accumulated in an electronic metering unit located within an underground enclosure is transmitted via radio frequency signals to a handheld data collection unit or to a mobile data collection unit carried in a vehicle. An assembly for installation in the underground enclosure includes an antenna enclosure, a transponder enclosure and means for enclosing and protecting an antenna within the antenna enclosure and a transponder within the transponder enclosure.

U.S. Pat. No. 5,416,475 to Tolbert, et al. discloses a remote meter reading receptacle for pit lid mounting including an annular, cup-shaped housing containing a ferrite coil and electronic circuit board. This housing is mounted within an outer shroud which has an annual flange formed about its periphery. The shroud includes a pair of openings, the first for receiving a threaded fastener, such a bolt, and the other for receiving an electrical cable connected to the circuit board of the housing. The shroud is dimensioned to fit securely within an opening formed in the lid of a pit-type meter box, such as used for outdoor setting of water meters. A complementary cup-shaped washer includes a pair of openings for cooperating with the threaded fastener and for receiving the electrical cable. The washer is disposed on the underside of the pit lid and receives the threaded fastener to fasten the housing and shroud assembly securely to the upper surface of the pit lid. The washer is reversible to accommodate a wide range of pit-lid thicknesses. The pit lid receptacle requires only a single hole to be drilled in the pit lid. The receptacle is formed from a ultraviolet stable polycarbonate plastic material. The receptacle is low in profile and provides for secure positioning of the ferrite coil and associated electronic circuit board in an easily assembled housing assembly.

U.S. Pat. No. 5,621,419 to Meek, et al. discloses a radio antenna for mounting in the lid of a water meter box and forming part of a remote meter reading system comprises an annular conductive plate and a circular conductive plate which are coaxial with and parallel to each other and spaced apart to define a slot, the circular plate serving as a ground plate. The antenna has an input in the form of a conductive pillar interconnecting the two members, with a drive input at a selected point along the length of the pillar and a second input on the ground plate. A variable tuning capacitance is disposed between the plates diametrically opposite the conductive pillar. The ground plate also serves for locating the lid in undergrowth or under snow using a metal detector.

U.S. Pat. No. 5,760,706 to Kiss discloses an RF control system characterized by the use of remotely located low profile radio frequency antennas which are concealed in conventionally appearing valve boxes or similar housings. The system includes a central control station, including a central RF transmitter, and a plurality of remote station, each including an RF receiver and antenna. A preferred remote station includes a valve box or similar housing of the type intended to be at least partially buried in the earth. The housing has a peripheral wall defining an access opening and a removable cover for bridging the opening. A directional discontinuity ring radiator (DDRR) antenna is physically mounted in the valve box housing on the interior side of the cover and is connected to a receiver, preferably also physically mounted on the cover.

U.S. Pat. No. 5,825,303 to Bloss, Jr., et al. discloses a sealed housing for a transponder unit in a utility meter pit enclosure having a tube, approximately 33/4 inches long and 11/2 inches in diameter, in which transponder electronics carried by a circuit board and an antenna are inserted from the bottom and fitted into guide structures. A body of epoxy sealant is used to seal and form a recessed lower end of the tube which, in use, may be immersed in water within a subsurface pit enclosure. The tube is attached to a cap and suspended through a hole in the pit lid. A clamping member is threaded onto the lower end of the tube for trapping a portion of the pit lid between said clamping member and the cap. A method of assembling and sealing the unit is also disclosed.

U.S. Pat. No. 5,877,703 to Bloss, Jr., et al. discloses an improved assembly for housing electronics for remote reading of meter reading data in a subsurface enclosure including a first inner enclosure of metal for housing the receiver/transmitter circuitry, a second inner enclosure for housing a battery and an outer enclosure of plastic which encloses both of the inner enclosures and additionally provides a sealed compartment for an antenna.

U.S. Pat. No. 6,072,405 to Sears discloses a meter transmission unit for transmitting a signal indicative of utility usage at a utility meter which is adapted for use with a pit set utility meter located in a pit having a cover and an opening therein for supporting the meter transmission unit and a method of installing the meter transmission unit. The meter transmission unit includes a tubular housing having a detachable flange at one end thereof for supporting the meter transmission unit on the pit cover and includes an annular collar having vertical adjustment means extending through the annular collar for engaging with the bottom of the pit cover to pull the flange tightly toward the top surface of the pit cover.

U.S. Pat. No. 6,177,883 to Jennetti, et al. discloses an arrangement for radio utility meter reading processing of data acquisition for use with an automatic billing system involving a water meter transmitter antenna system installed at or near ground level in an outdoor environment. A radio frequency utility meter communication apparatus transmits utility meter data to a remote utility meter data collection unit from an underground pit box. The pit box receives a utility meter and has a generally ground level pit lid with an opening therethrough. An antenna element has an upper member extending at least partly through the pit lid opening and received thereabove. A depending base of the antenna element extends from the upper element and passes through the pit lid opening into the underground pit box. The antenna element is at least partly exposed to its surrounding environment. An RF transmitter inside the underground pit box is associated with the antenna element depending base so that RF signals output by the RF transmitter are propagated by the antenna element. A utility meter also located within the underground pit box is arranged for outputting its data to the RF transmitter, so that the upper portion of the antenna element at least partly situated above an exterior, above ground portion of the pit box lid, propagates utility meter data from the utility meter within the pit box to a remote utility meter data collection unit.

U.S. Pat. No. 6,218,995 to Higgins, et al. discloses a telemetry antenna system for transmitting data from underground utility meters including a telemetry board, a radiator assembly connected to the telemetry board and a housing assembly for housing both the telemetry board and the radiator assembly. The radiator assembly preferably includes two metallic plates separated by an air gap dielectric and connected by a plurality of inductive shunts. Capacitive tuning pads are also included on the plates and are connected by shunts. The housing assembly preferably includes a cylindrical base having an integral annular ring. The base houses the telemetry board. The radiator assembly is operably connected to the telemetry board and is housed and located within a radome which sealingly engages the annular ring. The radome is sealingly secured to the annular ring of the base by a retaining ring which is tightly, releasably fastened to the annular ring of the base. The housing assembly may include additional elements such as an end cap, base lock, spine and/or bulkhead.

U.S. Pat. No. 6,300,907 to Lazar, et al. discloses an antenna assembly for subsurface utility metering equipment including a disk-shaped radiating element which is connected through a wire having a self-inductance to a capacitor C and then to a ground plane and a connector for a coaxial cable to provide an LC circuit for impedance matching of the antenna assembly to a transmitter.

U.S. Pat. No. 6,378,817 to Bublitz, et al. discloses a kit for variably positioning an antenna housing and a transmitter housing in a subsurface enclosure with a utility meter and a meter register including a bracket which is rotatable with the antenna housing to a selected position within 360.degree. of rotation, and then secured with fasteners to the stem of the antenna housing. The kit also includes a spacer which is held between the top flange of the bracket and an underside of the pit lid. The bracket also has a depending flange for mounting the transmitter assembly in a suspended position from the antenna housing in either a horizontal or vertical orientation to better utilize available space in the pit enclosure.

U.S. Pat. No. 6,414,605 to Walden, et al. discloses an apparatus and methodology for radio utility meter reading processing of data acquisition for use with an automatic billing system involving a utility meter transmitter antenna system installed at or near ground level. An RF utility meter communication apparatus transmits utility meter data to a remote utility meter data collection unit from an underground pit box. The pit box includes a utility meter and has a generally ground level pit lid with an opening therethrough. An antenna element has an upper member extending at least partly through such pit lid opening. A depending base of the antenna element extends from the upper element and passes through the pit lid opening into the underground pit box. The depending antenna element is capacitively coupled or provided with some other form of non-mechanical coupling to the output of an RF transmitter also included within the pit box. The antenna element components are nested for ease of attachment to or removal from a pit lid, with a rotatable threaded nut received about a depending antenna element for drawing tight against the underside of the pit lid, with an upper antenna element received above such pit lid. An antenna element may be directly coupled with a metallic pit lid so that such metallic pit lid functions as part of the antenna. Alternative embodiments may be provided for structure of the antenna element, so as to minimize the structure and components needed for removably securing or installing the antenna arrangement, supported on the removable pit lit of a conventional pit box.

U.S. Pat. No. 6,617,976 to Walden, et al. discloses an apparatus and methodology for radio utility meter reading processing of data acquisition for use with an automatic billing system involving a utility meter transmitter antenna system installed at or near ground level. An RF utility meter communication apparatus transmits utility meter data to a remote utility meter data collection unit from an underground pit box. The pit box includes a utility meter and has a generally ground level pit lid with an opening therethrough. An antenna element has an upper member extending at least partly through such pit lid opening. A depending base of the antenna element extends from the upper element and passes through the pit lid opening into the underground pit box. The depending antenna element is capacitively coupled or provided with some other form of non-mechanical coupling to the output of an RF transmitter also included within the pit box. The antenna element components are nested for ease of attachment to or removal from a pit lid, with a rotatable threaded nut received about a depending antenna element for drawing tight against the underside of the pit lid, with an upper antenna element received above such pit lid. An antenna element may be directly coupled with a metallic pit lid so that such metallic pit lid functions as part of the antenna. Alternative embodiments may be provided for structure of the antenna element, so as to minimize the structure and components needed for removably securing or installing the antenna arrangement, supported on the removable pit lit of a conventional pit box.

U.S. Pat. No. 6,851,567 to McKinnon discloses a meter box lid having an opening extending between its top and bottom sides with a door movable to an open or closed position. Also provided is a U-shaped shelf or holder which can be removably coupled to the bottom side of the lid for forming a cavity below the bottom side of the lid for holding a transponder for meter reading purposes such that the lid without the holder can be provided to users who do not use transponders or with the holder to users who use transponders for meter reading purposes.

U.S. Pat. No. 6,954,144 to Kiser, et al. discloses a water pit transponder assembly including a housing with multiple sections including top, main and bottom sections snap latched together connected to a water meter. A circuit board transponder in the housing includes a controller, a transmitter, a receiver and tamper detection software connected to antennas. An encoder is connected to the water meter, and batteries provide power to operate the assembly. The transponder sends and receives at different frequencies through different antennas and is protected from environmental corrosion by being encapsulated in a get inside the housing.

U.S. Pat. No. 6,968,969 to McKinnon, Jr. discloses a lid used to cover a utility box which houses a meter such as a water meter. The lid is compression molded from a plastic material such as medium density polyethylene, and has a planar upper surface and a planar lower surface. In one embodiment, a plurality of generally parallel spaced apart recesses are formed in the lower surface. The recesses are spaced inward of the outer edges of the lid. The area of the lower surface of the lid is greater than the total area of the recesses in the plane of the lower surface. In another embodiment, an opening leading to a cavity is formed in the edge of the lid with a press fit passage for receiving a transponder device.

U.S. Patent Application 20040196159 to Brennan, et al. discloses a bracket and method for use in mounting a transducer/antenna unit in an underground meter box of the type which contains a remote-reading water meter. The box has a peripheral ledge defining an access opening that seats a lid. The bracket comprises a pair of beams which are spaced-apart sufficient to enable the installation and support of a cap containing the antenna. A pair of right angles on the beam ends are seated between the ledge and lid to suspend the beam and therefore the antenna at a predetermined height below the lid. The height is sufficient for holding the antenna at a position which is optimum for radiating RF signals for pick up by an above-ground remote receiver.

U.S. Patent Application 20060103547 to Salser, et al. discloses a method and apparatus for adding Automatic Meter Reading (AMR) capabilities to utility meters that generate a magnetic field comprising magnetic flux that varies proportionally with the rate of resource consumption. The apparatus comprises a dual magnetic field sensor unit for detecting variations in the magnetic flux density for the magnetic field. The sensor unit may be compact in size so that it can be positioned within a utility meter. The sensor unit may be operatively connected to a data-unit located outside the utility meter. The data unit may be further configured for storing processed or unprocessed sensor signals and is connected to a transmitter. To minimize power consumption, the magnetic field sensors may be configured to have sensor on times and sensor off times. The on/off state of the magnetic field sensors may be controlled by either a dedicated sensor controller or the data unit.

U.S. Patent Application 20060226325 to Cook, et al. discloses a bracket and method for use in mounting a transducer/antenna unit in an underground meter box of the type which contains a remote-reading water meter. The box has a peripheral ledge defining an access opening that seats a lid. The bracket comprises a pair of beams which are spaced-apart sufficient to enable the installation and support of a cap containing the antenna. A pair of right angles on the beam ends are seated between the ledge and lid to suspend the beam and therefore the antenna at a predetermined height below the lid. The height is sufficient for holding the antenna at a position which is optimum for radiating RF signals for pick up by an above-ground remote receiver.

Although the aforementioned prior art have contributed to the development of the art of container devices, none of these prior art patents have solved the needs of this art.

Therefore, it is an object of the present invention to provide an improved antenna mounting bracket for mounting an antenna within a water meter container.

Another object of this invention is to provide an improved antenna mounting bracket that may be adapted to be utilized in many different water meter containers.

Another object of this invention is to provide an improved antenna mounting bracket that is adaptable to engage many different types of antennas.

Another object of this invention is to provide an improved antenna mounting bracket that will rigidly secure the antenna adjacent to the top of the water meter container.

Another object of this invention is to provide an improved antenna mounting bracket that will improve the radiation pattern of a radio frequency emanating from the antenna.

Another object of this invention is to provide an improved antenna mounting bracket that is inexpensive to construct.

Another object of this invention is to provide an improved antenna mounting bracket that is easily installed.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved antenna mounting bracket for mounting an antenna within a water meter container. The water meter container defines a tubular body extending from a bottom aperture to a top aperture. The top aperture includes a lip for supporting a cap. The cap covers the top aperture. The water meter container houses a water meter for measuring the volume of water traversing through the water meter and generating an electronic signal corresponding to the volume of water. A water input pipe inputs water into the water meter. A output water pipe outputs the water from the water meter. An electric conduit electrically couples the water meter to an antenna. The antenna transmits a wireless signal from the electronic signal.

The mounting bracket comprises a first plate having a top surface, a bottom surface, a front edge and a rear edge. A first elongated aperture traverses through the first plate. A first slit traverses through the first plate and parallel to the first elongated aperture. A first step is secured to the rear edge of the first plate for supporting the first plate upon the lip of the water meter container. A second plate defines a top surface, a bottom surface, a front edge and a rear edge. A second elongated aperture traverses through the second plate. A second slit traverses through the second plate and parallel to the second elongated aperture. A second step is secured to the rear edge of the second plate for supporting the second plate upon the lip of the water meter container. The bottom surface of the first plate slidably engages adjacent to the top surface of the second plate with the first step being a mirror image of the second step for defining an adjustable bracket length. The bottom surface of the first plate slidably engages adjacent to the top surface of the second plate for overlaying the first elongated aperture and the second elongated aperture and defining an adjustable elongated aperture. The bottom surface of the first plate slidably engages adjacent to the top surface of the second plate for overlaying the first slit and the second slit and defining an adjustable slit. A fastener traverses through the adjustable slit for secures the first plate to the second plate after setting the adjustable bracket length to equal the top aperture. The adjustable elongated aperture engages the antenna for positioning the antenna above the water meter.

In a more specific embodiment of the invention, the first plate further including a third elongated aperture traverses through said first plate. The second plate further including a fourth elongated aperture traversing through the second plate. The bottom surface of the first plate slidably engages adjacent to the top surface of the second plate for overlaying the first elongated aperture and third elongated aperture with either the second elongated aperture or the fourth elongated aperture and defining a plurality of adjustable elongated apertures.

In a more specific embodiment of the invention, the first plate further includes a third slit traverses through the first plate and parallel to the first elongated aperture. A fourth slit traverses through the second plate and parallel to the second elongated aperture. The bottom surface of the first plate slidably engages adjacent to the top surface of the second plate for overlaying the third slit and the fourth slit and defining a second adjustable slit. A second fastener traverses through the second adjustable slit for securing the first plate to the second plate after setting the adjustable bracket length to equal the top aperture. A third fastener traverses through the first adjustable slit for secures the first plate to the second plate after setting the adjustable bracket length to equal the top aperture. A fourth fastener traverses through the second adjustable slit for securing the first plate to the second plate after setting the adjustable bracket length to equal the top aperture.

In a more specific embodiment of the invention, the first plate and the first step are an integral one piece unit. The second plate and the second step are an integral one piece unit. The first plate, the first step, the first elongated aperture, and the first slit being identical to the second plate, the second step, the second elongated aperture, and the second slit respectively for manufacturing only a single unit.

In a more specific embodiment of the invention, the first plate and the first step are an integral one piece metallic unit creating a first ground plane for increasing the radiation pattern of a radio frequency emanating from the antenna. The second plate and the second step are an integral one piece metallic unit creating a second ground plane for increasing the radiation pattern of a radio frequency emanating from the antenna.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 1:
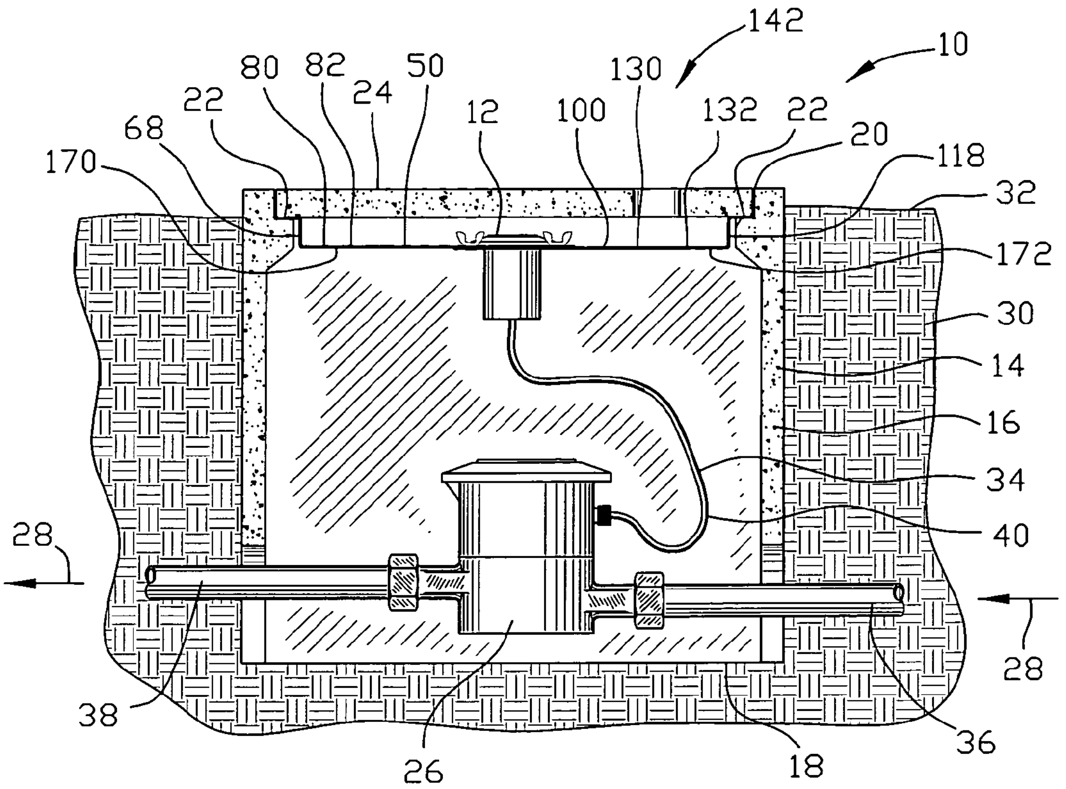
FIG. 1 is a side view of an antenna mounting bracket for mounting an antenna within a water meter container incorporating the present invention.
Figure 2:
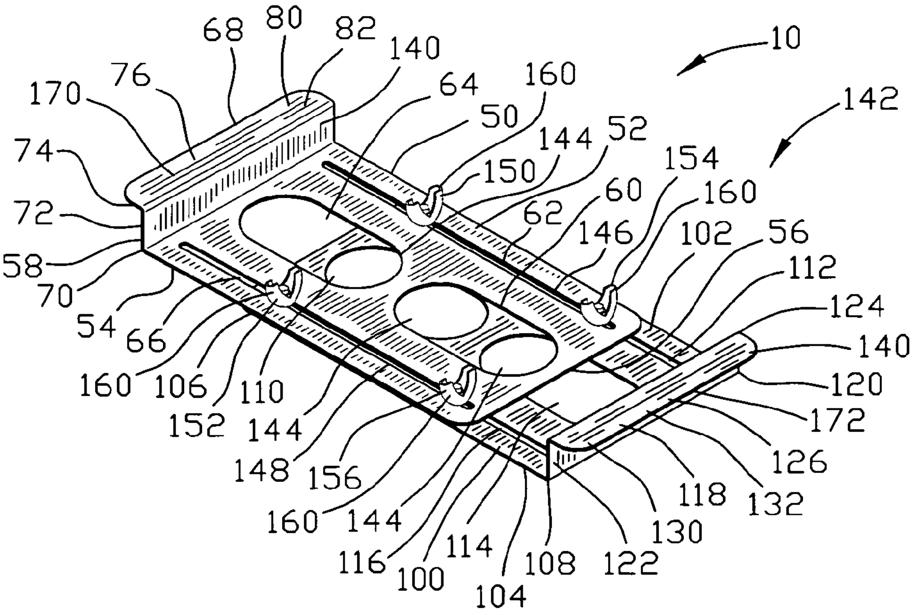
FIG. 2 is an isometric of the antenna mounting bracket as shown in FIG. 1.
Figure 3:
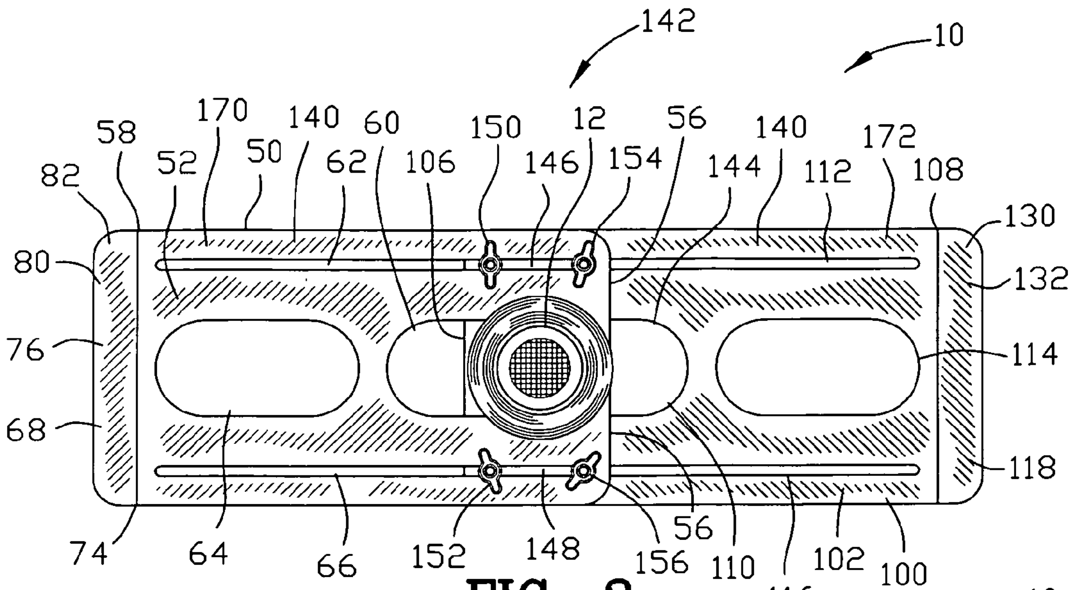
FIG. 3 is a top view of the antenna mounting bracket illustrating a first length.
Figure 4:
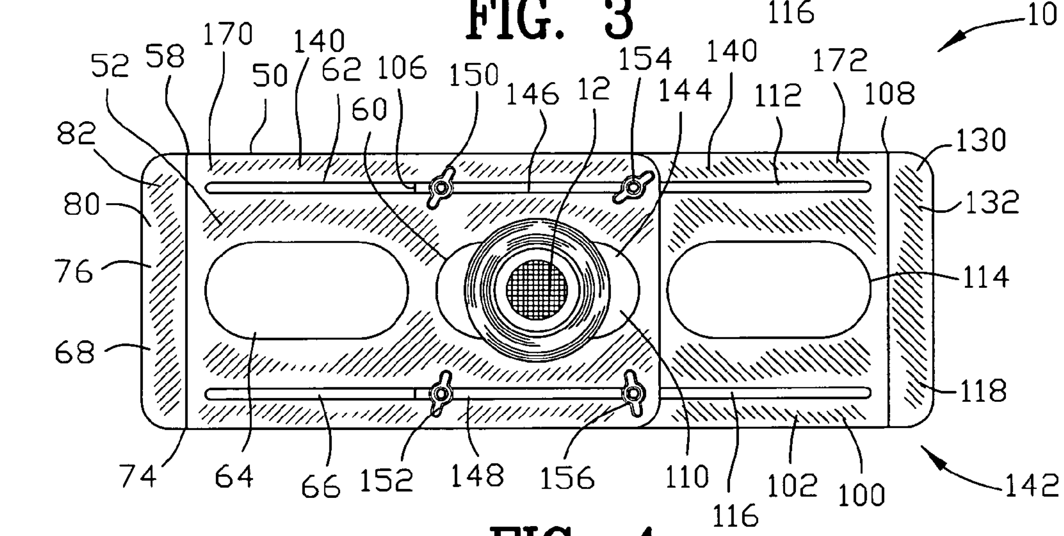
FIG. 4 is a top view of the antenna mounting bracket illustrating a second length.
Figure 5:
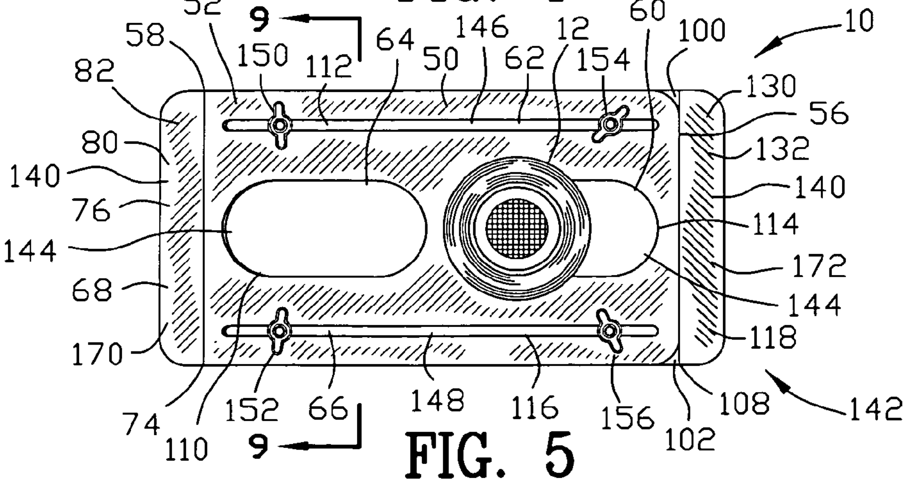
FIG. 5 is a top view of the antenna mounting bracket illustrating a third length.
Figure 6:
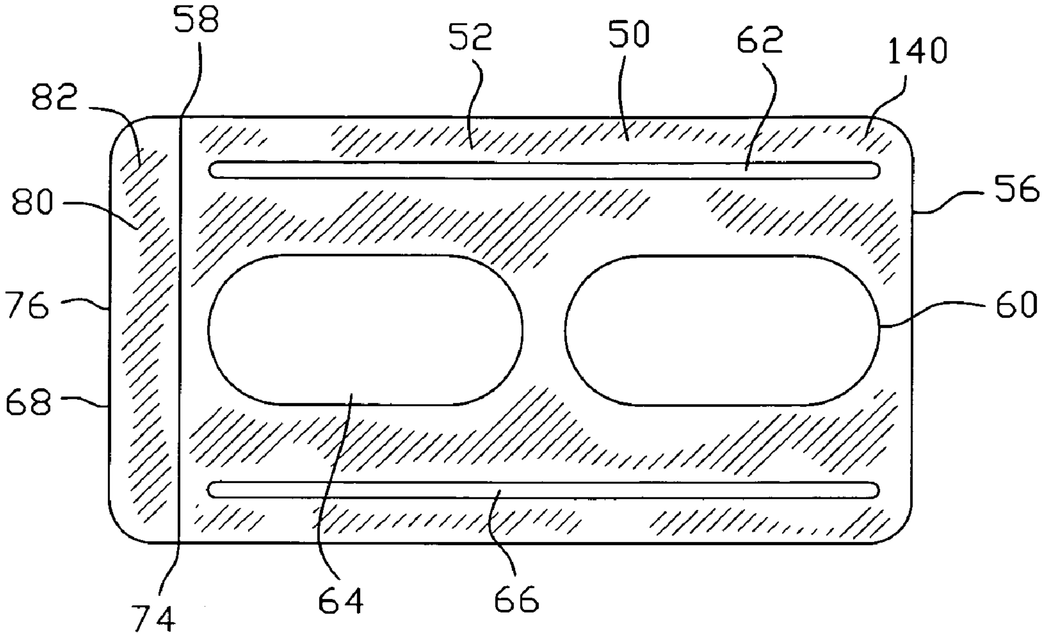
FIG. 6 is a top view of a plate utilized as both a first plate and second plate as shown in FIGS. 1 and 2.
Figure 7:
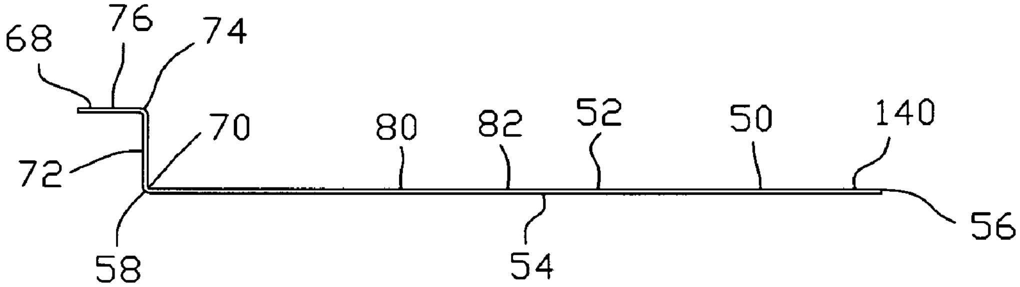
FIG. 7 is a side view of FIG. 6.
Figure 8:
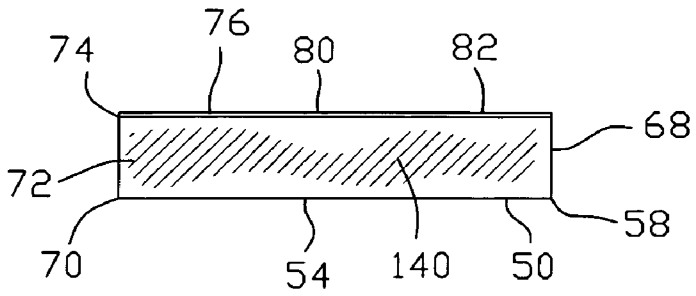
FIG. 8 is a left side view of FIG. 7.
Figure 9:
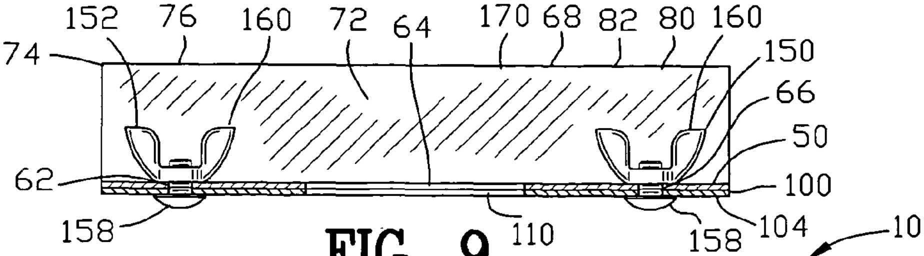
FIG. 9 is a sectional view along line 9-9 in FIG. 5.
Figure 10:
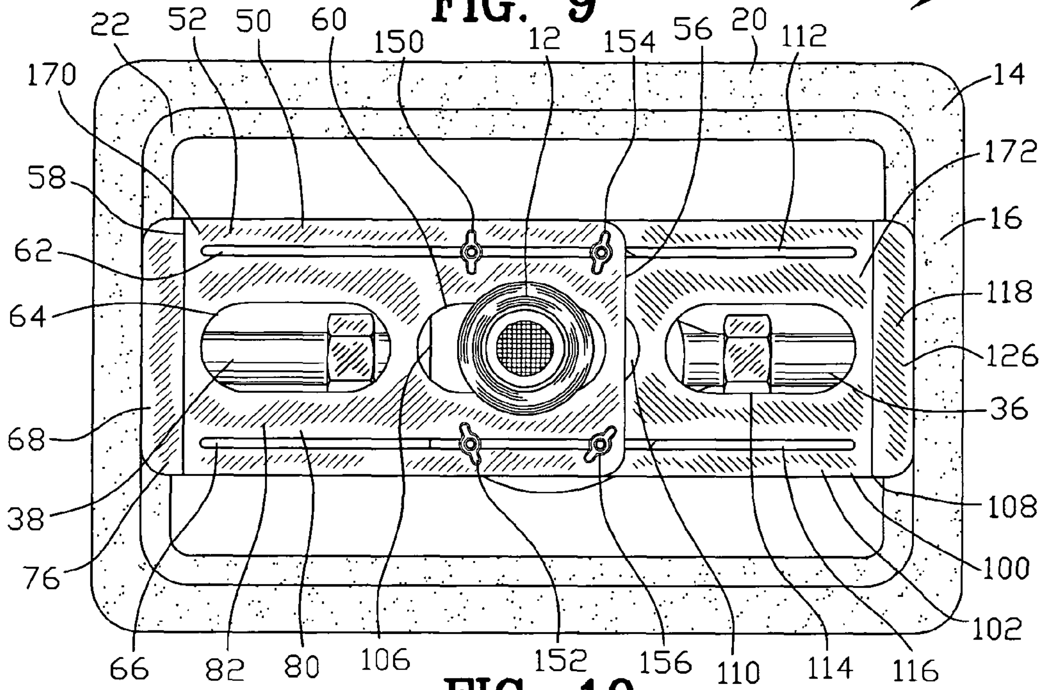
FIG. 10 is a view similar to FIG. 4 with the antenna mounting bracket positioned within the water meter container.
Figure 11:
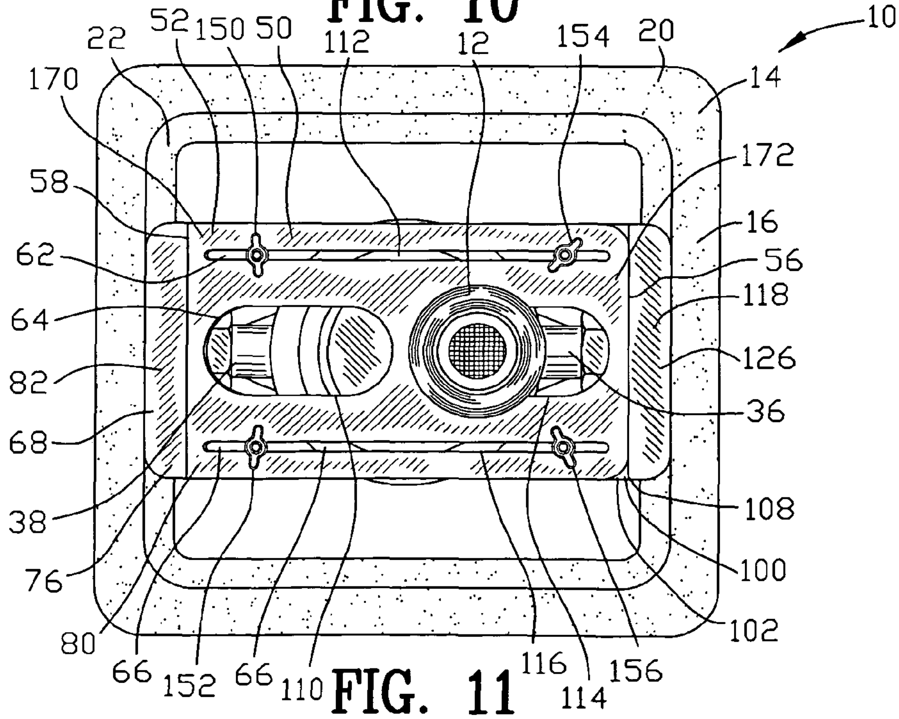
FIG. 11 is a view similar to FIG. 5 with the antenna mounting bracket positioned within the water meter container.

FIGS. 1-13 are various views of an antenna mounting bracket 10 for mounting an antenna 12 within a water meter container 14 incorporating the present invention. The water meter container 14 defines a tubular body 16 extending from a bottom aperture 18 to a top aperture 20. The top aperture 20 includes a lip 22 for supporting a cap 24. The cap 24 covers the top aperture 20. The water meter container 14 may be positioned within the ground 30. The ground 30 has a ground surface 32.

The water meter container 14 houses a water meter 26 for measuring the volume of water 28 traversing through the water meter 26 and generating an electronic signal 34 corresponding to the volume of water 28. A water input pipe 36 inputs water into the water meter 26. An output water pipe 38 for outputs the water from the water meter 26. An electric conduit 40 electrically couples the water meter 26 to the antenna 12. The antenna 12 transmits a wireless signal 42 from the electronic signal 34. The wireless signal 42 may include radio frequency 44.

The antenna mounting bracket 10 comprises a first plate 50 having a top surface 52, a bottom surface 54, a front edge 56 and a rear edge 58. A first elongated aperture 60 traverses through the first plate 50. A first slit 62 traverses through the first plate 50 and is parallel to the first elongated aperture 60. The first plate 50 may further include a third elongated aperture 64 traversing through the first plate 50. Furthermore, the first plate 50 may include a third slit 66 traversing through the first plate 50 and orientated parallel to the first elongated aperture 60.

A first step 68 is secured to the rear edge 58 of the first plate 50 for resting upon the lip 22 of the water meter container 14 to support the first plate 50 in a horizontal position. The first step 68 further includes a first ninety degree bend 70 positioned between the first plate 50 and a first spacer leg 72. A second ninety degree bend 74 is positioned between the first spacer leg 72 and a first lip leg 76. The first lip leg 76 rests on the lip 22 of the water meter container 14 for supporting the first plate 50. The first lip leg 76 is further restrained adjacent to the lip 22 by the positioning of the cap 24 upon the first lip leg 76. The first spacer leg 72 permits the positioning of the first plate 50 below the lip 22 of the water meter container 14 for allowing the cap 24 to engage the water meter container 14.

Preferably, the first plate 50 and the first step 68 are an integral one piece unit 80 constructed from a metallic material 82. The metallic material 82 may include aluminum, steel or other rigid alloy. The first plate 50 may be constructed by stamping a sheet metallic material. The first elongated aperture 60, first slit 62, third elongated apertures 64 and third slit 66 may also be created by stamping. The first step 68 may be constructed by bending the metallic material 82.

The antenna mounting bracket 10 further includes a second plate 100 having a top surface 102, a bottom surface 104, a front edge 106 and a rear edge 108. A second elongated aperture 110 traverses through the second plate 100. A second slit 112 traverses through the second plate 100 and is parallel to the second elongated aperture 110. The second plate 100 may further include a fourth elongated aperture 114 traversing through the second plate 100. Furthermore, the second plate 100 may include a fourth slit 116 traversing through the second plate 100 and orientated parallel to the second elongated aperture 110.

A second step 118 is secured to the rear edge 108 of the second plate 100 for resting upon the lip 22 of the water meter container 14 to support the second plate 100 in a horizontal position. The second step 118 further includes a third ninety degree bend 120 positioned between the second plate 100 and a second spacer leg 122. A fourth ninety degree bend 124 is positioned between the second spacer leg 122 and a second lip leg 126. The second lip leg 126 rests on the lip 22 of the water meter container 14 for supporting the second plate 100. The second lip leg 126 is further restrained adjacent to the lip 22 by the positioning of the cap 24 upon the second lip leg 126. The second spacer leg 122 permits the positioning of the second plate 100 below the lip 22 of the water meter container 14 for allowing the cap 24 to engage the water meter container 14.

Preferably, the second plate 100 and the second step 118 are an integral one piece unit 130 constructed from a metallic material 82. The metallic material 82 may include aluminum, steel or other rigid alloy. The second plate 100 may be constructed by stamping a sheet metallic material. The second elongated aperture 110, second slit 112, fourth elongated apertures 114 and fourth slit 116 may also be created by stamping. The second step 118 may be constructed by bending the metallic material 82.

Preferably, the first plate 50, the first step 68, the first elongated aperture 60, the third elongated aperture 64, the first slit 62 and the third slit 66 have the identical dimensions and construction to the second plate 100, the second step 118, the second elongated aperture 110, the fourth elongated aperture 114, the second slit 112 and the fourth slit 116 respectively for requiring only the manufacturing of a single unit 140. The single unit 140 greatly reduces the cost and time of manufacturer of the antenna mounting bracket 10 and allows the first plate 50 and the second plate 100 to be interchangeable.

To utilize the antenna mounting bracket 10, the bottom surface 54 of the first plate 50 slidably engages adjacent to the top surface 102 of the second plate 100 with the first step 68 being a mirror image of the second 118 for creating an adjustable bracket length 142 between the first step 68 and the second step 118. Furthermore, the overlaying of the first elongated aperture 60 and the third elongated aperture 64 adjacent to either the second elongated aperture 110 or fourth elongated aperture 114 forms a plurality of adjustable elongated apertures 144. Additionally, the overlaying of the first slit 62 adjacent to the second slit 112 and the overlaying of the third slit 66 adjacent to the fourth slit 116 define a first adjustable slit 146 and a second adjustable slit 148 respectively.

A first fastener 150 and a third fastener 154 traverse through the first adjustable slit 146 and for securing compressing the first plate 50 and the second plate 100 together. The compressive force applied by the first fastener 150 and the third fastener 154 prevent any movement of the first plate 50 relative to the second plate 100. The antenna mounting bracket 10 may further include a second fastener 152 and a fourth fastener 156 traversing through the second adjustable slit 148 for securing compressing the first plate 50 and the second plate 100 together. The compressive force applied by the second fastener 152 and the fourth fastener 156 prevent any movement of the first plate 50 relative to the second plate 100. The first fastener 150, second fastener 152, third fastener 154 and fourth fastener 156 may include screws 158 and wing nuts 160.

To install the antenna mounting bracket 10, the dimensions of the lip 22 of the water meter container 14 are first determined. As best seen in FIGS. 3-5 and FIGS. 10 and 11, the first plate 50 and the second plate 100 are next positioned such that the bottom surface 54 of the first plate 50 slidably engages adjacent to the top surface 102 of the second plate 100 with the first step 68 being a mirror image of the second 118. The adjustable bracket length 142 between the first step 68 and the second step 118 is then set to be commensurate with a dimension of the lip 22 of the water meter container 14. The first fastener 150, second fastener 152, third fastener 154 and fourth fastener 156 then engage through the first plate 50 and the second plate 100 to prevent further movement of the first plate 50 and the second plate 100.

The antenna is then inserted into one of the plurality of adjustable elongated aperture 144 and is secured between the first plate 50 and the second plate 100. The first lip leg 76 of the first step 68 and the second lip leg 126 of the second step 118 is positioned onto the lip 22 of the water meter container 14. Since the first lip leg 76 and the second lip leg 126 are constructed from a thin plate material, the first and second lip legs 76 and 126 are capable of resting upon the lip 22 and still permit the cap 24 to be positioned onto the water meter container 14. Furthermore, the first spacer leg 72 and the second spacer leg 122 permit the antenna 12 to be positioned adjacent to the cap 24 and above the water meter 26. By positioning the antenna 12 adjacent to the cap 24, the antenna 12 is approximately at the same elevation as the ground surface 32.

Figure 12:
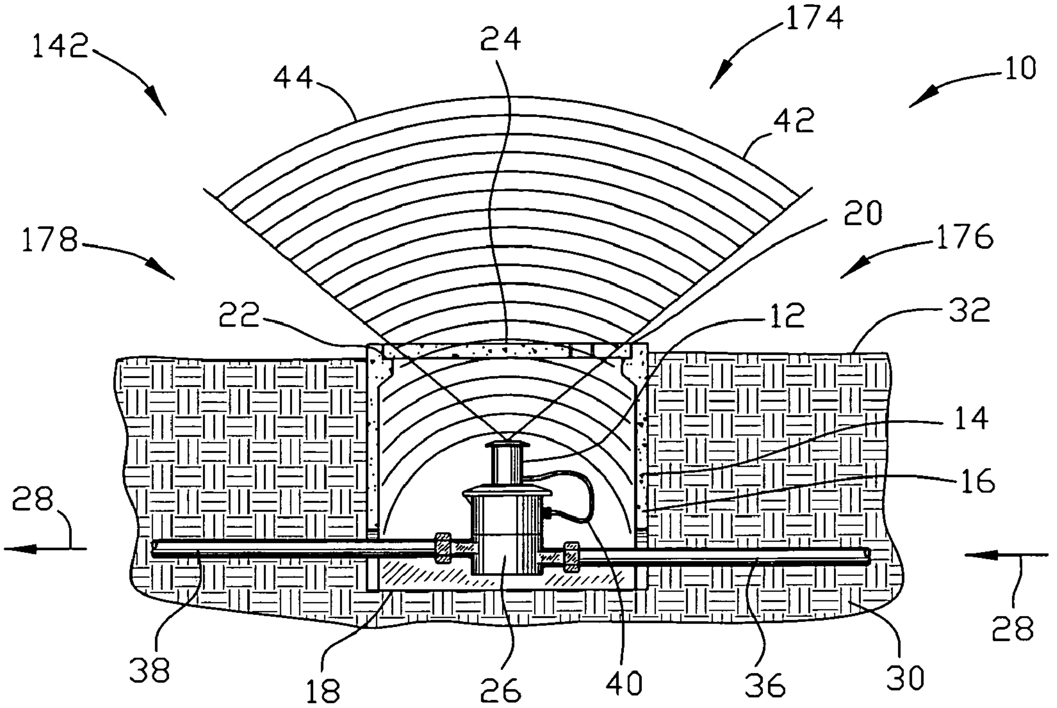
FIG. 12 is a view similar to FIG. 1 illustrating the radiation pattern of a radio frequency emanating from the antenna without the antenna mounting bracket.
Figure 13:
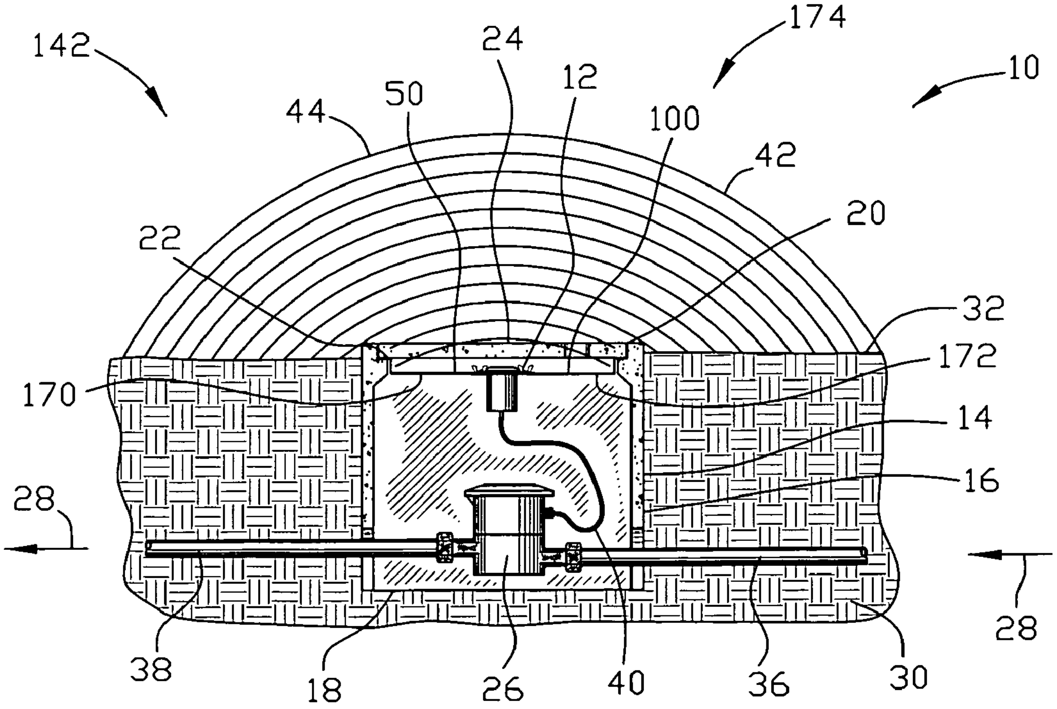
FIG. 13 is a view similar to FIG. 1 illustrating the radiation pattern of a radio frequency emanating from the antenna with the antenna mounting bracket.

Since both the first plate 50 and the second plate 100 are constructed of an integral one piece unit metallic, the first plane 50 creates a first ground plane 170 and the second plate 100 creates a second ground plane 172. The first ground plane 170 and the second ground plane 172 served to expand or increases the radiation pattern 174 of the radio frequency 44 emanating from the antenna 12. In FIG. 12, the antenna 12 is positioned atop the water meter 26. The radiation pattern 174 of the radio frequency in FIG. 12 contains a first and second void 176 and 178, wherein reception of the radio frequency will be questionable. As seen in FIG. 13, the antenna mounting bracket 10 eliminates any radio frequency voids.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An antenna mounting bracket in combination with a water meter container for mounting an antenna, the water meter container defining a tubular body extending from a bottom aperture to a top aperture, the top aperture including a lip for supporting a cap, the cap covering the top aperture, the water meter container housing a water meter for measuring the volume of water traversing through the water meter and generating an electronic signal corresponding to the volume of water, a water input pipe for inputting water into the water meter, a output water pipe for outputting the water from the water meter, an electric conduit electrically coupling the water meter to the antenna, the antenna transmitting a wireless signal from the electronic signal, the mounting bracket, comprising: a first plate having a top surface, a bottom surface, a front edge and a rear edge; a first elongated aperture traversing through said first plate; a first slit traversing through said first plate and parallel to said first elongated aperture; a first step secured to said rear edge of said first plate for supporting said first plate upon the lip of the water meter container; a second plate defining a top surface, a bottom surface, a front edge and a rear edge; a second elongated aperture traversing through said second plate; a second slit traversing through said second plate and parallel to said second elongated aperture; a second step secured to said rear edge of said second plate for supporting said second plate upon the lip of the water meter container; said bottom surface of said first plate slidably engaging adjacent to said top surface of said second plate with said first step being a mirror image of said second step for defining an adjustable bracket length; said bottom surface of said first plate slidably engaging adjacent to said top surface of said second plate for overlaying said first elongated aperture and said second elongated aperture and defining an adjustable elongated aperture; said bottom surface of said first plate slidably engaging adjacent to said top surface of said second plate for overlaying said first slit and said second slit and defining an adjustable slit; a fastener traversing through said adjustable slit for securing said first plate to said second plate after setting said adjustable bracket length to equal the top aperture; and said adjustable elongated aperture engaging the antenna for positioning the antenna above the water meter.

2. An antenna mounting bracket as set forth in claim 1, wherein said first plate further including a third elongated aperture traversing through said first plate;

said second plate further including a fourth elongated aperture traversing through said second plate; and said bottom surface of said first plate slidably engaging adjacent to said top surface of said second plate for overlaying said first elongated aperture and third elongated aperture with either said second elongated aperture or said fourth elongated aperture and defining a plurality of adjustable elongated apertures.

3. An antenna mounting bracket as set forth in claim 1, wherein said first plate further including a third slit traversing through said first plate and parallel to said first elongated aperture;

a fourth slit traversing through said second plate and parallel to said second elongated aperture;

said bottom surface of said first plate slidably engaging adjacent to said top surface of said second plate for overlaying said third slit and said fourth slit and defining a second adjustable slit; and a second fastener traversing through said second adjustable slit for securing said first plate to said second plate after setting said adjustable bracket length to equal the top aperture.

4. An antenna mounting bracket as set forth in claim 1, wherein said first plate further including a third slit traversing through said first plate and parallel to said first elongated aperture;

a fourth slit traversing through said second plate and parallel to said second elongated aperture;

said bottom surface of said first plate slidably engaging adjacent to said top surface of said second plate for overlaying said third slit and said fourth slit and defining a second adjustable slit;

a second fastener traversing through said second adjustable slit for securing said first plate to said second plate after setting said adjustable bracket length to equal the top aperture;

a third fastener traversing through said first adjustable slit for securing said first plate to said second plate after setting said adjustable bracket length to equal the top aperture; and a fourth fastener traversing through said second adjustable slit for securing said first plate to said second plate after setting said adjustable bracket length to equal the top aperture.

5. An antenna mounting bracket as set forth in claim 1, wherein said first plate and said first step are an integral one piece unit;

said second plate and said second step are an integral one piece unit; and said first plate and second plate being identical for manufacturing only a single unit.

6. An antenna mounting bracket as set forth in claim 1, wherein said first plate and said first step are an integral one piece unit;

said second plate and said second step are an integral one piece unit; and said first plate, said first step, said first elongated aperture, and said first slit being identical to said second plate, said second step, said second elongated aperture, and said second slit respectively for manufacturing only a single unit.

7. An antenna mounting bracket as set forth in claim 1, wherein said first step further including a first ninety degree bend positioned between said first plate and a first spacer leg;

a second ninety degree bend positioned between said first spacer leg and a first lip leg;

said second step further including a third ninety degree bend positioned between said second plate and a second spacer leg;

a fourth ninety degree bend positioned between said second spacer leg and a second lip leg;

said first lip leg and said second lip leg resting on the lip of the water container for supporting said first plate and said second plate; and said first spacer leg and said second spacer leg positioning said first plate and said second plate below the lip of the water container for permitting the cap to engage the water container.

8. An antenna mounting bracket as set forth in claim 1, wherein said first plate and said first step are an integral one piece unit;

said second plate and said second step are an integral one piece unit;

said first plate and second plate being identical for manufacturing only a single unit; and said integral one piece unit constructed from a metallic material.

9. An antenna mounting bracket as set forth in claim 1, wherein said first plate and said first step are an integral one piece metallic unit creating a first ground plane for increasing the radiation pattern of a radio frequency emanating from the antenna; and said second plate and said second step are an integral one piece metallic unit creating a second ground plane for increasing the radiation pattern of a radio frequency emanating from the antenna.

10. An antenna mounting bracket for mounting an antenna within a water meter container, the water meter container defining a tubular body extending from a bottom aperture to a top aperture, the top aperture including a lip for supporting a cap, the cap covering the top aperture, the water meter container housing a water meter for measuring the volume of water traversing through the water meter and generating an electronic signal corresponding to the volume of water, a water input pipe for inputting water into the water meter, a output water pipe for outputting the water from the water meter, an electric conduit electrically coupling the water meter to an antenna, the antenna transmitting a wireless signal from the electronic signal, the mounting bracket, comprising;

a first plate having a top surface, a bottom surface, a front edge and a rear edge;

a first elongated aperture traversing through said first plate;

a first slit traversing through said first plate and parallel to said first elongated aperture;

a first step secured to said rear edge of said first plate;

a second plate defining a top surface, a bottom surface, a front edge and a rear edge;

a second elongated aperture traversing through said second plate;

a second slit traversing through said second plate and parallel to said second elongated aperture;

a second step secured to said rear edge of said second plate;

said bottom surface of said first plate slidably engaging adjacent to said top surface of said second plate with said first step being a mirror image of said second step for defining an adjustable bracket length;

said bottom surface of said first plate slidably engaging adjacent to said top surface of said second plate for overlaying said first elongated aperture and said second elongated aperture and defining an adjustable elongated aperture;

said bottom surface of said first plate slidably engaging adjacent to said top surface of said second plate for overlaying said first slit and said second slit and defining an adjustable slit;

a fastener traversing through said adjustable slit for securing said first plate to said second plate after setting said adjustable bracket length to equal the top aperture;

said first step defining a first arm for supporting said first plate upon the lip of the water meter container;

said second step defining a second arm for supporting said second plate upon the lip of the water meter container;

said adjustable elongated aperture engaging the antenna for positioning the antenna above the water meter;

said first plate and said first step including an integral one piece metallic unit creating a first ground plane for increasing the radiation pattern of a radio frequency emanating from the antenna; and said second plate and said second step including an integral one piece metallic unit creating a second ground plane for increasing the radiation pattern of a radio frequency emanating from the antenna.

* * * * *